(12) United States Patent
Dengler et al.

(10) Patent No.: US 9,126,866 B2
(45) Date of Patent: Sep. 8, 2015

(54) POLYCARBOXYLATE ETHERS WITH BRANCHED SIDE CHAINS

(71) Applicant: Construction Research & Technology GmbH, Trostberg (DE)

(72) Inventors: Joachim Dengler, Tacherting Wajon (DE); Alexander Kraus, Pittenhart (DE); Rabie Al-Hellani, Ludwigshafen (DE); Anna Cristadoro, Raleigh, NC (US); Silke Flakus, Ebersberg (DE); Nicoletta Zeminian, Treviso (IT); Ida Ros, Zero Branco TV (IT)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 14/199,100

(22) Filed: Mar. 6, 2014

(65) Prior Publication Data
US 2014/0256857 A1    Sep. 11, 2014

Related U.S. Application Data

(60) Provisional application No. 61/773,211, filed on Mar. 6, 2013.

(51) Int. Cl.
| | | |
|---|---|---|
| C04B 24/26 | (2006.01) | |
| C08F 216/16 | (2006.01) | |
| C08F 220/10 | (2006.01) | |
| C08F 222/06 | (2006.01) | |
| C08K 3/34 | (2006.01) | |
| C04B 24/16 | (2006.01) | |
| C04B 24/24 | (2006.01) | |
| C08F 283/06 | (2006.01) | |
| C08F 290/14 | (2006.01) | |
| C04B 103/40 | (2006.01) | |

(52) U.S. Cl.
CPC .......... *C04B 24/2641* (2013.01); *C04B 24/165* (2013.01); *C04B 24/246* (2013.01); *C04B 24/2647* (2013.01); *C08F 283/065* (2013.01); *C08F 290/142* (2013.01); *C04B 24/2605* (2013.01); *C04B 24/2664* (2013.01); *C04B 2103/408* (2013.01)

(58) Field of Classification Search
CPC ............ C04B 24/2605; C04B 24/2641; C04B 24/2664; C08K 3/34; C08F 216/16; C08F 216/14; C08F 216/12; C08F 222/06; C08F 220/10

USPC .......... 526/320, 333, 332, 319; 106/606, 624, 106/602, 600; 524/2, 5
See application file for complete search history.

(56) References Cited

U.S. PATENT DOCUMENTS

| | | | |
|---|---|---|---|
| 6,133,347 A | 10/2000 | Vickers, Jr. et al. | |
| 6,358,310 B1 | 3/2002 | Berke et al. | |
| 6,384,111 B1 * | 5/2002 | Kistenmacher et al. | ........ 524/5 |
| 6,451,881 B1 | 9/2002 | Vickers, Jr. et al. | |
| 6,454,850 B2 * | 9/2002 | Yamashita et al. | ........... 106/724 |
| 6,486,260 B1 * | 11/2002 | Yuasa et al. | ........... 525/327.7 |
| 6,492,461 B1 | 12/2002 | Vickers, Jr. et al. | |
| 6,545,083 B1 * | 4/2003 | Hirata et al. | ............ 524/556 |
| 6,837,712 B2 * | 1/2005 | Qian | ............ 433/228.1 |
| 6,861,459 B2 | 3/2005 | Vickers, Jr. et al. | |
| 6,908,955 B2 | 6/2005 | Porsch et al. | |
| 6,932,964 B1 * | 8/2005 | Kim et al. | ............ 424/70.16 |
| 7,772,351 B2 * | 8/2010 | Dupont et al. | ............ 528/25 |
| 7,825,192 B2 * | 11/2010 | Gane et al. | ............ 525/242 |
| 8,110,130 B2 * | 2/2012 | Kensicher et al. | ............ 264/71 |
| 8,476,341 B2 | 7/2013 | Sakamoto et al. | |
| 8,492,497 B2 * | 7/2013 | Al-Hellani et al. | ............ 526/304 |
| 2007/0161724 A1 | 7/2007 | Moraru et al. | |
| 2011/0015361 A1 * | 1/2011 | Al-Hellani et al. | ............ 526/304 |
| 2011/0136944 A1 | 6/2011 | Bogdan et al. | |
| 2011/0137030 A1 | 6/2011 | Kubanek et al. | |
| 2011/0160393 A1 | 6/2011 | Sakamoto et al. | |
| 2012/0073475 A1 | 3/2012 | Maitrasse et al. | |
| 2012/0214901 A1 | 8/2012 | Bury et al. | |

FOREIGN PATENT DOCUMENTS

| | | | | |
|---|---|---|---|---|
| JP | 2000-273794 A | * | 10/2000 | ............ D21H 19/20 |
| JP | 2010-222195 | | 10/2010 | |
| WO | WO 2005/075529 A2 | | 8/2005 | |
| WO | WO 2010/112775 A1 | | 10/2010 | |
| WO | WO 2011/006838 A2 | * | 1/2011 | |

* cited by examiner

*Primary Examiner* — Rip A Lee
(74) *Attorney, Agent, or Firm* — Curatolo Sidoti Co., LPA; Joseph G. Curatolo; Salvatore A. Sidoti

(57) ABSTRACT

A method of utilizing a copolymer for dispersing inorganic binders, the copolymer comprising as comonomers in copolymerized form at least one ethylenically unsaturated acid monomer and at least one ethylenically unsaturated, branched polyether macromonomer. Further disclosed are dispersants for inorganic binders, comprising the subject copolymer, and building material mixtures comprising inorganic binders and the subject dispersant.

14 Claims, No Drawings

POLYCARBOXYLATE ETHERS WITH BRANCHED SIDE CHAINS

The present application claims the benefit of the filing date of U.S. Provisional Application for Patent, U.S. Ser. No. 61/773,211, filed Mar. 6, 2013, under 35 U.S.C. §119(e), which application is incorporated by reference herein.

Provided is a method for utilizing a copolymer for dispersing inorganic binders, the copolymer comprising as comonomers in copolymerized form:

(A) at least one ethylenically unsaturated acid monomer,
(B) at least one ethylenically unsaturated, branched polyether macromonomer of the general formula $E-V_kL_{k+1}$, where E is an ethylenically unsaturated structural unit which comprises at least one ether, carboxylic ester or carboxamide structural unit, V is a branched structural unit of the formula $-CH(CH_2O-)_2$, and L is a linear structural unit of the formula $-[A^1O]_l-A^2$, where $A^1$ in each case independently is selected from $C_2$-$C_{10}$ alkylene, $C_6$-$C_{10}$ arylene and/or $C_7$-$C_{10}$ aralkylene, preferably $-C_2H_4-$, $A^2$ in each case independently is selected from $C_1$-$C_{30}$ alkyl, $C_3$-$C_{10}$ cycloalkyl, $C_6$-$C_{30}$ aryl and/or $C_7$-$C_{30}$ aralkyl, preferably $C_1$-$C_4$ alkyl, k is an integer from 1 to 7, preferably from 1 to 3, and l in each case independently is an integer from 1 to 350, preferably from 2 to 100, more particularly from 5 to 70 and very preferably from 7 to 17.

It is known that aqueous slurries of organic or inorganic substances in powder form, such as clays, ground silicate, chalk, carbon black, ground rock and hydraulic binders are often admixed with admixtures in the form of dispersants for the purpose of improving their processing properties, i.e. kneadability, spreadability, sprayability, pumpability or fluidity. Such admixtures are capable of disrupting agglomerated solids, dispersing the particles formed, and in this way improving the fluidity. This effect is also exploited in particular, in a targeted way, in the production of building material mixtures which comprise hydraulic binders, such as cement, lime, gypsum, calcium sulphate hemihydrate (bassanite) or anhydrous calcium sulphate (anhydrite), or latent hydraulic binders such as fly ash, blast furnace slag or pozzolans.

To convert these building material mixtures, based on the stated binders, into a ready-to-use processable form, there is generally a need for a substantially greater amount of batching water than would be necessary for the subsequent hydration and hardening process. The cavity fraction in the concrete element, formed by the excess water that later evaporates, leads to significantly impaired mechanical strengths and resistance properties.

To reduce this excess water fraction for a given processing consistency, and/or to improve the processing properties for a given water/binder ratio, admixtures are used that are generally identified as water reducers or superplasticizers. Employed more particularly as such admixtures in practice are copolymers prepared by radical copolymerization of acid monomers with polyether macromonomers. Concrete plasticizers are added to the concrete alongside other additives in order either to facilitate processing at a constant water/cement value or to obtain plastic viscosity in the case of reduced water/cement values. By this means it is possible, for example, to improve the concrete's pumpability or to raise the compressive strength and density and to shorten the cure time.

Currently in use as concrete plasticizers are lignosulphonates, sulphonated melamine-formaldehyde resins and naphthalene-formaldehyde resins, and also polycarboxylates. Examples of polycarboxylates are, for example, copolymers of maleic acid and/or acrylic acid with polyether macromonomers (e.g. alkoxylated vinyl ethers or (meth)acrylate esters of alkylpolyalkylene glycols).

Dispersants based on polycarboxylate ethers (PCEs) can be adapted individually to the requirements of the concrete industry. This is done by modifying the chemical composition of the copolymers. PCEs generally have a main polymer chain of carbon atoms and side chains which comprise polyether structures. Located on the main polymer chain are acid groups. It is possible to modify the side chain length and the molar ratios of the acid groups and polyether side chains in order to obtain concrete of a very high quality.

For concrete for precast component works, superplasticizers are required that allow a very high plasticizing effect, rapid setting, good early strength, and low viscosity in the cement produced using them. High plasticizing effect combined with good early strengths are presently available, however, only from superplasticizers having relatively long (greater than 3000 g/mol) polyether side chains, as described for example in WO/05075529 A2. Usually, however, this causes the fresh concrete to have a decidedly high viscosity. As a result of this, the fresh concrete, especially in the case of low W/C values, is very difficult to place and is difficult to shape. Consequently, in the precast component works, the moulds can only be reliably filled at high cost and complexity.

Pumpable concrete and ready-mixed concrete require a relatively wide time window within which the concrete possesses the same consistency and processing properties. Here, the mixing times tend to play a minor part, while the slump retention (retention of consistency) is very important here. Since the pump pressure correlates with the viscosity (Buckingham-Reiner equation), and in order to minimize the mechanical abrasion and cost and complexity of instrumentation, the viscosity ought to be extremely low for a long time even in the case of pumpable concrete. As mentioned above for the precast component concrete, high viscosities in the fresh concrete are very deleterious to processing properties.

For the stated applications, however, there are presently no acceptable solutions that combine sufficient dispersability with, in particular, low concrete viscosities.

A concrete admixture that supplies relatively low viscosity on the part of the concrete is OPTIMA® 100 from Chryso, for example. This dispersant, which is based not on a polycarboxylate technology (phosphonated polyether, corresponding to WO 2010/112775 A1), is restricted in its use, however, since particularly at low W/C values it often does not display adequate plasticizing. The said product also often has retarding properties and is generally not so suitable for concrete for precast components.

The market presently requires dispersants which allow a high dispersing effect, a low concrete viscosity, and the effective development of early strength in the concrete.

Disclosed in (US2011/0015361 A1) are copolymers which have in copolymerized form at least one ethylenically unsaturated monocarboxylic or dicarboxylic acid and at least one structural unit of the general formula I. The general formula I exhibits partial overlap with the branched polyether macromonomers (B) disclosed herein. However, US2011/0015361 A1 gives no indication at all of the use as water reducers in inorganic binders or concrete, instead disclosing applications as thickeners in the sectors of laundry detergents and cleaners (textile segment) and also in the cosmetic sector.

The present patent application provides dispersants for dispersing inorganic binders, more particularly dispersants for use in cementitious systems such as concrete and mortar, which allow a sufficient dispersing effect, and more particularly, a low viscosity on the part of the concrete of the concrete.

This is achieved through utilizing, such as by admixing, a copolymer for dispersing inorganic binders, the copolymer comprising as comonomers in copolymerized form:

(A) at least one ethylenically unsaturated acid monomer, (B) at least one ethylenically unsaturated, branched polyether macromonomer of the general formula $E-V_k L_{k+1}$, the parameters $E$, $V_k$, and $L$ being defined as specified above.

The inorganic binder may be selected from cements, from cements, more particularly portland cements and aluminate cements, from α-calcium sulphate hemihydrate, β-calcium sulphate hemihydrate, anhydrite and lime, from industrial and synthetic slags, more particularly blast furnace slags, slag sand, ground slag sand, electrothermal phosphorus slag and stainless steel slag, from pozzolanic binders, more particularly fly ashes, preferably brown coal fly ash and mineral coal fly ash, microsilica, metakaolin, natural pozzolans, more particularly tuff, trass and volcanic ash, natural and synthetic zeolites, calcined oil shale and mixtures of these. A preferred binder is (portland) cement. The subject superplasticizers may be metered preferably at from 0.1 to 1 wt %, based on the inorganic binder or binders, preferably 0.2 to 0.6 wt %.

Subject Copolymers (Dispersants)

As far as the dispersing mechanisms of the polycarboxylate ethers is concerned, the conceptualization assumes that the anionically charged acid groups of the polycarboxylate ethers attached to the surfaces of the cement grain, that as a result of calcium ions have a positive charge. The hydrophilic polyether side chains point predominantly away from the cement grain, into the likewise hydrophilic aqueous pore solution of the cementitious binder batched with water.

In contrast to linear polyether side chains of the prior art, the present dispersants comprise at least singly or else multiply branched polyether side chains. For the same mass, the subject polyether macromonomers (B) are certainly greater in their steric bulk. More particularly they differ in their length (for the same mass), with the subject polyether macromonomers (B) being shorter on account of the branching. Surprisingly it has been found that these structural differences lead to a reduction in the viscosity of fresh concrete. This has the advantage that a relatively high plasticizing effect and in particular a low viscosity (better processing/pumping properties) can be obtained.

In the case of conventional PCEs with unbranched, more particularly long, polyether side chains, the inventors, in the course of their work, arrived at the hypothesis that an interaction ("hooking") of the long linear polyether side chains into one another could be seen as a reason for the high viscosity of the resultant concrete. As a result of this interaction there are also interactions between polyether side chains attached on different cement grains, thus explaining the higher viscosity of the concrete. The inorganic binder particles, preferably cement particles, are less well dispersed. As the length of the side chain goes up, this effect increases, and the interactions (presumably mediated via the PCEs) between the dispersed cement grain particles become stronger, a phenomenon manifested macrophysically in an increase in the viscosity of the concrete.

In the text below, the present dispersants, constructed from acid monomers (A) and polyether macromonomers (B), will be described in more detail.

Acid Monomer (A)

Possible examples of (A) ethylenically unsaturated acid monomer include carboxylic acid monomers, especially monocarboxylic or dicarboxylic acid monomers, sulphonic acid monomers, phosphonic acid monomers and/or phosphoric ester monomers. Among the phosphoric ester monomers, the phosphoric monoester monomers are preferred, and it is also possible to utilize phosphoric diester monomers. Preferred are carboxylic acid monomers and phosphoric ester monomers; sulphonic acid monomers are less preferred. The stated acid monomers may be used both in their (partially) neutralized form (by alkalis such as alkali metal- or alkaline earth metal-based alkalis, ammonia, organic amines, etc., for example), and in their acidic form. Independently of one another it is possible for one or more kinds of ethylenically unsaturated acid monomers to be employed. The acid monomer (A) is preferably monoethylenically unsaturated.

Examples of suitable monoethylenically unsaturated dicarboxylic acids are itaconic acid, citraconic acid, mesaconic acid, glutaconic acid, aconitic acid, maleic acid, fumaric acid, maleic anhydride, itaconic anhydride and mixtures of two or more of the aforementioned compounds, including the respective salts. Particularly preferred is maleic acid, which can also be used in the anhydride form.

Suitable monoethylenically unsaturated monomer carboxylic acids are (meth)acrylic acid, ethacrylic acid, and (E)- and (Z)-crotonic acid. Preferred is (meth)acrylic acid; acrylic acid is especially preferred.

Also preferred is utilizing one or more monoethylenically unsaturated monocarboxylic acids and one or more monoethylenically unsaturated dicarboxylic acids; utilizing maleic acid and acrylic acid is especially preferred.

Preference is given to the method of utilizing characterized in that the at least one copolymerized ethylenically unsaturated acid monomer (A) is present in the copolymer in the form of one of the following structural units (Ia) to (Id):

(Ia)

where $R^1$ in each case independently is selected from H, an unbranched and/or branched $C_1$-$C_4$ alkyl group, X in each case independently is selected from a single bond, $-NH-(C_m H_{2m})-$ and/or $-O-(C_m H_2 O-$, where m is an integer from 1 to 4, $R^2$ in each case independently is selected from $-OM_{1/q}$, $-SO_3 M_{1/3}$, $-PO_3 M_{2/q}$, $-O-PO_3 M_{2/q}$, $-C_6 H_4-SO_3 M_{1/q}$, $-C_6 H_4-PO_3 M_{2/q}$ and/or $-C_6 H_4-OPO_3 M_{2/q}$, where M is selected from H, alkali metals, alkaline earth metals, aluminium and/or metals of the first transition series, and q represents the charge number of M, with the proviso that $R^2$ is represented by $—OM_{1/q}$ if X is a single bond;

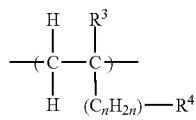
(Ib)

where
$R^3$ has the meaning given above for $R^1$,
n is an integer from 0 to 4,
$R^4$ in each case independently is selected from $—SO_3M_{1/q}$, $—PO_3M_{2/q}$, $—O—PO_3M_{2/q}$ and/or $—C_6H_4—SO_3M_{1/q}$, where M and q have the meanings stated above;

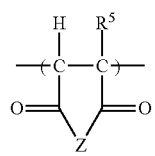
(Ic)

where
$R^5$ has the meaning given above for $R^1$,
Z in each case independently is selected from $—O—$ and/or $—NH—$;

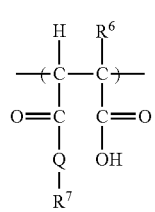
(Id)

where
$R^6$ has the meaning given above for $R^1$,
Q has the meaning given above for X and,
$R^7$ has the meaning given above for $R^2$.

Preference is given to the method of utilizing characterized in that in the formula (Ia)
$R^1$ is H or methyl,
X in each case independently is selected from $—NH—(C_mH_{2m})—$ and $—O—(C_mH_{2m})—$ and preferably is $—O—(C_2H_4)—$ or $—NH—(C(CH_3)_2CH_2)—$, and
$R^2$ is $—O—PO_3M_{2/q}$ or $—O—SO_3M_{1/q}$,
where m, M and q have the meanings given above.

Preference as radical $R^2$ in the formula (Ia) is additionally given to $—O—PO_3M_{2/q}$, and as $X—O—(C_mH_{2m})$. Particularly preferred as phosphorous-containing acid monomers (A) are hydroxyethyl (meth)acrylic phosphoric ester (HE(M)A-phosphate) and hydroxypropyl (meth)acrylic phosphoric ester (HP(M)A-phosphate) and in each case their salts. The corresponding diphosphoric esters may likewise be used, but are less preferred.

Preference is given to the method of utilizing characterized in that the acid monomer (A) or the acid monomers (A) is or are selected from (meth)acrylic acid and salts thereof, maleic acid, its monoesters, monoamides and salts, maleic anhydride and/or hydroxyalkyl (meth)acrylic phosphoric esters and salts thereof, with preference being given to hydroxyethyl (meth)acrylic phosphoric ester and hydroxypropyl (meth)acrylic phosphoric ester and in each case their salts.

Polyether Macronomomer (B)

The subject copolymers comprise as comonomer in copolymerized form at least one ethylenically unsaturated, branched polyether macromonomer (B) of the general formula (I) $E-V_kL_{k+1}$. In the copolymer it is possible to employ independently of one another identical or different polyether macromonomers (B).

(B) in the general formula (I) comprises an ethylenically unsaturated, preferably a monoethylenically unsaturated, structural unit (E), which comprises at least one ether, carboxylic ester or carboxamide structural unit. The ether and carboxylic ester structural units preferably comprise exclusively oxygen atoms, in contrast to, for example, sulphur-containing embodiments such as sulphur ethers. The structural unit E preferably comprises two to six carbon atoms and at least one oxygen atom, more preferably two to five carbon atoms and at least one oxygen atom.

Examples of E which comprise ethers are $CH_2=CH—O—$, $CH_2=CH—O—(CH_2)_4—O—$, $CH(CH_3)=CH—O—$, $CH_2=CH—O—[A^3O]_m—$, where $-A^3$ in each case independently is selected from $C_2-C_{10}$ alkylene, $C_6-C_{10}$ arylene and/or $C_7-C_{10}$ aralkylene; preferably $A^3$ is $—C_2H_4—$; m is in each case independently an integer from 1 to 50, preferably from 2 to 40, especially preferably from 5 to 25. It is particularly preferred for $A^3$ in each case independently of one another to be present at more than 60 mol %, based on all of the structural units of the formula $-[A^3O]_m$ in the form of $—C_2H_4—$. The aforementioned ethers are vinyl ethers, since an oxygen atom is located directly on the unsaturated structural unit. Vinyl ethers are preferred since they are relatively reactive and easy to prepare.

Further examples E which comprise ethers include the (meth)allyl ethers ($CH_2=CH—CH_2—O—$, or $CH_2=C(Me)-CH_2—O—$), and the isoprenol ethers ($CH_2=CMe-(CH_2)_2—O—$).

Among the ethylenically unsaturated carboxylic esters there is a preferred distinction between monocarboxylic acid derivatives and dicarboxylic acid derivatives.

Examples of monoethylenic unsaturated structural units E from the area of the monocarboxylic acid derivatives are (meth)acrylic esters such as $CH_2=CH—COO—$, $CH_2=CMe-COO—$, $CH_2=CH—COO—[A^3O]_m—$, $CH_2=CMe-COO—[A^3O]_m—$, and the corresponding esters of (E)- and (Z)-crotonic acid such as $CH(Me)=CH—COO—$, $CH(Me)=CH—COO—[A^3O]_m—$. $A^3$ and m, including the preferred ranges, are defined as stated above.

Examples of monoethylenically unsaturated structural units E from the area of the dicarboxylic acid derivatives are monoesters of maleic acid ($HOOCH=CH(COO)—$), the corresponding esters of fumaric acid and of itaconic acid ($CH_2=C—C(COOH)(CH_2—COO)$).

Examples of structural units E which comprise carboxamide structural units include (meth)acrylamides such as $CH_2=CH—CO—N(R)—$, $CH_2=CMe-CON(R)—$ and maleic monoamide ($HOOCH=CH—CO—N(R))—$, where R in each case independently of one another is selected from H, $C_1-C_{30}$ alkyl, $C_6-C_{30}$ aryl and/or $C_7-C_{30}$ aralkyl, R preferably being H or $C_1-C_4$ alkyl; more particularly preferred from $C_1-C_4$ alkyl is methyl.

Preference is given to the method of utilizing copolymers characterized in that the structural unit E in each case independently is selected from a vinyl ether, allyl ether, isoprenyl ether, (meth)acrylic ester, (meth)acrylamide, maleic monoester and/or maleic monoamide unit. Especially preferred are vinyl ether, (meth)acrylic ester and/or (meth)acrylamide units.

Preference is given to the method of utilizing characterized in that the copolymer comprises as additional comonomer in copolymerized form an unbranched polyether macromonomer of the general formula E-L, where E and L have the meanings given above. In the unbranched polyether macromonomer E-L, L is preferably a linear structural unit of the formula $-[A^1O]_l-A^2$, where $A^1$ in each case independently is selected from $C_2-C_{10}$ alkylene, $C_6-C_{10}$ arylene and/or $C_7-C_{10}$ aralkylene, preferably $-C_2H_4-$, $A^2$ in each case independently is selected from $C_1-C_{30}$ alkyl, $C_3-C_{10}$ cycloalkyl, $C_6-C_{30}$ aryl and/or $C_7-C_{30}$ aralkyl, preferably $C_1-C_4$ alkyl, and l in each case independently is an integer from 7 to 30, preferably from 12 to 25, especially preferably from 15 to 20.

The preferred range for the side chain length, defined via the parameter l, has the advantage that the moderately long side chains (preferably from 7 to 30) are able to make a contribution to the dispersibility, while still not increasing the application viscosity, more particularly the viscosity in the concrete, as a result of excessive length.

Preference is given to the method of utilizing copolymers, characterized in that the ethylenically unsaturated structural unit E is present in the form of E*-S, where E* in each case independently is selected from a vinyl ether, allyl ether, (meth)acrylic ester and/or maleic monoester unit and S is a (poly)alkylene glycol unit $-[A^3O]_m-$, where $A^3$ in each case independently is selected from $C_2-C_{10}$ alkylene, $C_6-C_{10}$ arylene and/or $C_7-C_{10}$ aralkylene, $A^3$ preferably being $-C_2H_4-$, and m is in each case independently an integer from 1 to 50, preferably from 1 to 40, especially preferably from 1 to 25. It is particularly preferred for $A^3$ in each case independently of one another to be present to an extent of more than 60 mol %, based on all of the structural units of the formula $-[A^3O]_m-$, in the form of $-C_2H_4-$.

If E is present in the form of E*-S, there is preferably at least one alkylene oxide unit present as a "spacer" (abbreviated S) between E* and the relatively sterically bulky, branched structural unit $V_kL_{k+1}$. This leads to a higher reactivity in the synthesis of the polyether macromonomer (B) (etherification or esterification, as will be shown below), and increases the yield of (B). In the case of amines, the reactivity with respect to (meth)acrylic acid, (meth)acrylic anhydride, (meth)acryloyl chloride or maleic anhydride is higher in any case, since carboxamides are formed. Accordingly, a spacer does not bring such great reactivity advantages.

In the general formula (I), V is a branched structural unit $-CH(CH_2O-)_2$. V is a relatively hydrophilic polyether structural unit and therefore contributes to the water solubility of (B). For illustration it will be mentioned again that the actual branching site is the tertiary carbon atom, which is substituted by one H atom and two ($CH_2O-$). The polyether macromonomer (B) undergoes branching, in line with the general formula (I) $E-V_kL_{k+1}$, starting from the unsaturated structural unit E by way of the branched structural unit $V_k$. The index k here indicates the number of structural units V and hence of branching sites. In the hypotheoretical comparative case (not in accordance with the claims) of k being 0 there would be a single, unbranched side chain of the prior art (E-L). In the case where k is 1, two polyether side chains are introduced; in the case where k is 2 three polyether side chains are introduced; and so on.

V in the synthesis of the polyether macromonomer (B) originates from glycerol derivatives, more preferably from epichlorohydrin, whose reactivity is the greatest among the glycerol derivatives.

L is a linear structural unit of the formula $-[A^1O]_l-A^2$, the parameters $A^1$, $A^2$ and l meeting the definition stated above. The index l denotes the number of repeating alkylene oxide units and, like $A^1$ and $A^2$, may be the same or different independently of one another in a polyether macromonomer (B); that is, l may adopt different values within the same polyether macromonomer, and $A^1$ and $A^2$ may be the same or different.

L comprises linear, unbranched (poly)(cyclo)alkyl, (poly)aryl and/or (poly)aralkyl structural units, preferably (poly)alkylene structural units. The structural units L cap the polyether macromonomer. The number of branching structural units V and L is linked via the parameter k. The simple rule here is that the number of linear structural units L is greater by 1 and the number of branching structural units V. L represents a hydrophilic and readily water-soluble structural unit if $A^1$ is $C_2H_4-$. For this reason, $A^1$ is preferably $C_2H_4-$.

In the synthesis of the polyether macromonomer (B), L originates from monoalcohols of the formula $HO-[A^1O]-A^2$.

Synthesis of the Polyether Macromonomers (B)

The polyether macromonomers (B) may be synthesized in an at least two-stage operation. A distinction is made between the process stage (I) of reacting a linear monoalcohol to form a branched monoalcohol, and the process stage (II) which comprises the reaction of the resulting branched monoalcohol to give the ethylenically unsaturated polyether macromonomer (B) (etherification or esterification with suitable ethylenically unsaturated reagents).

In certain intermediate stages, the branched monoalcohol may also be transformed, optionally, into an amine, in which case subsequently, in the process stage (II), during the reaction with suitable ethylenically unsaturated carboxylic acids or carboxylic acid derivatives, carboxamides are formed.

Likewise optionally, the branched monoalcohol of the general structural formula (II) may be alkoxylated, thus giving a polyether monoalcohol of the formula $HO-[A^3O]_m-V_kL_{k+1}$, with a so-called spacer. In the (B) polyether macromonomer, E is then present in the form of E*-S. All of the parameters E*, $A^3$, m, V, k and L have the definitions stated above.

Process Stage (I)

Process stage (I) constitutes the reaction of a linear monoalcohol of the formula $HO-[A^1O]_l-A^2$ with a glycerol derivative, such as glycidol, glycerol carbonate or epichlorohydrin, preferably epichlorohydrin. The product is a branched polyether monoalcohol of the general formula (II)

$$HO-V_kL_{k+1}, \quad (II)$$

where the parameters V, k, L, $A^1$, l and $A^2$ are defined as stated above. It is possible to use the same or different alcohols of the formula $HO-[A^1O]_l-A^2$.

Said reaction takes place at best in the presence of bases, especially if epichlorohydrin is being used. The reactions can be carried out in the presence of a catalyst. Examples of suitable catalysts include organic and inorganic bases. Where epichlorhydrin is used as the reactive glycerol derivative, the base serves not only as a catalyst but also to neutralize the resultant hydrochloric acid. Examples of suitable inorganic bases include alkali metal carbonates and, in particular alkali metal hydroxides such as NaOH and KOH. Examples of suitable organic bases include tertiary amines, more particularly triethylamine and [2.2.2]diazabicyclooctane (DABCO), and also pyridine and para-N,N-dimethylaminopyridine.

In one embodiment, the reaction of glycerol derivatives, such as glycidol or glycerol carbonate, preferably epichlorohydrin, can be carried out in a solvent. Examples of suitable solvents include ethers, especially 1,4-dioxane, diisopropyl ether, tetrahydrofuran ("THF") and di-n-butyl ether. Other suitable solvents are n-butylacetate ("butyl acetate"), DMSO, N,N-dimethylformamide ("DMF") and N-methylpyrrolidone, and aromatic solvents such as toluene, for example.

In embodiments in which water is eliminated during the reaction of the linear monoalcohol of the formula HO-[A$^1$O]$_l$-A$^2$ with a glycerol derivative (e.g. glycerol), it is possible to employ a water-removing agent, as for example a molecular sieve, sodium sulphate or magnesium sulphate, or the water formed may be removed by azeotropic distillation.

These reactions are described in detail in US2011/0015361 A1. Through targeted control of the temperature and of the quantities of monomer, it is possible to obtain different branched polyether macromonomers, typically in the form of mixtures. Since the reactivity goes down as the number of k (chain length) goes up, it is advantageous to raise the temperature in steps. At relatively low reaction temperatures it is particularly advantageous to react only part of the epichlorohydrin with the monoalcohol of the formula (II), then to add further epichlorohydrin and to continue the reaction at elevated temperature. This sequence, described in US2011/0015361 A1, of substeps (adding epichlorohydrin, raising the temperature, and chemically reacting) can be repeated a number of times.

Generally speaking, these reactions furnish mixtures of monoalcohols of the general formula (II), with different values of k, but also with different kinds of constitutions for the same k. Set out below are a number of examples of possible structures.

For the simplest case of k as 1, for example, the following singly branched monoalcohol (IIa) is obtained from the reaction of two equivalents of linear monoalcohol of the formula HO-[A$^1$O]$_l$-A$^2$ with one equivalent of epichlorohydrin:

HO—CH[CH$_2$O—[A$^1$O]$_l$-A$^1$]$_2$. (IIa)

One equivalent of (IIa) may undergo further reaction with one equivalent of epichlorohydrin and one equivalent of monoalcohols of formula HO-[A$^1$O]$_l$-A$^2$ to react, for example, the following asymmetric product (IIb) (k=2):

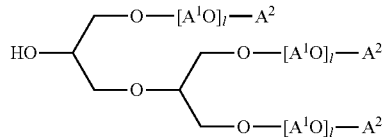
(IIb)

Two equivalents of (IIa) may undergo further reaction, for example, with one equivalent of epichlorohydrin to give the following symmetrical monoalcohol (IIc) (k=3):

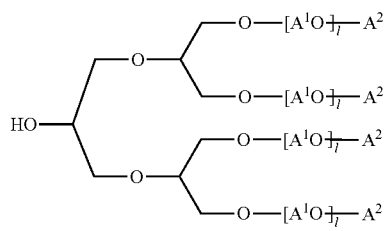
(IIc)

The structures (IIb) and (IIc) are constitutional isomers.

One equivalent of (IIb) may undergo further reaction, for example, with one equivalent of epichlorohydrin and one equivalent of monoalcohol of the formula HO-[A$^1$O]$_l$-A$^2$ to give the following asymmetric monoalcohol (IId) (k=3):

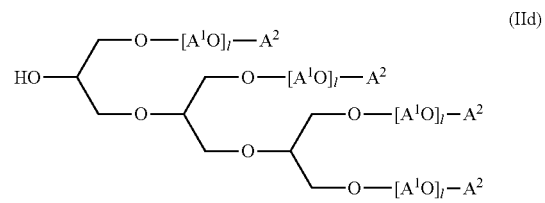
(IId)

One equivalent of (IIc) may undergo further reaction, for example, with one equivalent of epichlorohydrin and one equivalent of monoalcohol of the formula HO-[A$^1$O]-A$^2$ to give the following asymmetric monoalcohol (IIe) (k=4):

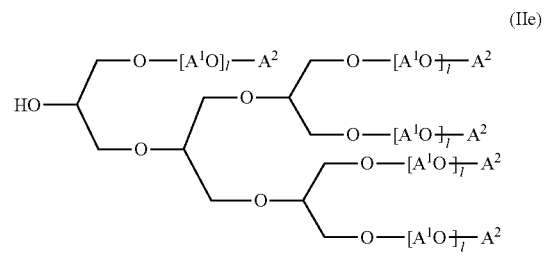
(IIe)

Preferred as polyether macromonomer (B) is a structural unit E-V$_{k+1}$ characterized in that V$_k$L$_{k+1}$ conforms to one of the formulae (IIa), (IIb), (IIc) and/or (IId), with the proviso that in the formulae (IIa), (IIb), (IIc) and (IId) in each case the OH group is replaced by a single bond. E, V and L here have the meanings stated above, and k is an integer from 1 to 3.

Optional Conversion of the Branched Monoalcohols (II) to Monoamines

As mentioned above, the branched monoalcohol of the general formula (II) HO—V$_{k+1}$ may also be transformed by a number of intermediate stages into a branched monoamine of the formula NH(R)—V$_k$L$_{k+1}$ (replacement of the OH group by an amino group NH(R)). For this purpose first of all in general there is an oxidation on the secondary alcohol function to give a ketone. This is followed by amination with an amine NH$_2$R, with elimination of water, to give the corresponding imine. The reduction of the imine with the hydrogen, for example, in the presence of catalysts (e.g. nickel or the like) leads to the corresponding branched monoamine. The monoamines have the structural formula NH(R)—V$_k$L$_{k+1}$, where R has the meanings stated above.

Process Stage (II)

In the second process stage (II) the branched monoalcohol II (e.g. the structures IIa, IIb, IIc, IId, IIe) may be modified by the introduction of an ethylenically unsaturated structural unit (E) to give the polyether macromonomer (B), as for example through the reaction with acetylene to give a vinyl ether. The reaction with (meth)allyl halides, preferably (meth)allyl chloride, leads for example to corresponding (meth)allyl ethers. With (meth)acrylic acid, (meth)acrylic anhydride or (meth)acryloyl halides, the corresponding (meth)acrylic esters are obtained. The ethylenically unsaturated structural unit may also be introduced by reaction with maleic anhydride, in which case the corresponding maleic monoester is obtained.

In an analogous way, from the branched monoamines NH(R)—V$_k$L$_{k+1}$, through reaction with (meth)acrylic acid, (meth)acrylic anhydride or (meth)acryloyl halides, the corresponding carboxamides are obtained, or, in the case of maleic anhydride, the maleic monoamide.

The respective esterification, amidation and etherification reactions are well known in the prior art and are preferably carried out under dehydrating conditions.

For the reaction with acetylene, it is possible to employ one or more catalysts, preferably selected from basic catalysts. Particularly suitable is KOH.

The reaction with acetylene can be carried out with or without solvent. Examples of suitable solvents include N-methylpyrrolidone, N-ethylpyrrolidone, toluene, xylene, THF and dioxane. The reaction with acetylene can be carried out, for example, at temperatures in the range from 80 to 160° C., preferred temperatures being around 120° C., as for example 110 to 130° C. The acetylation can be carried out under atmospheric pressure or, preferably at elevated pressure, as for example at 2 to 30 bar.

The method of utilizing may be characterized in that $A^1$ in each case independently is present to an extent of more than 60 mol %, more preferably to an extent of more than 80 mol %, based on all of the structural units of the formula -$[A^1O]_l$-, in the form of —$C_2H_4$—, $A^2$ in each case independently is selected from $C_1$-$C_4$ alkyl, k is an integer from 1 to 3 and l in each case independently is an integer from 2 to 100.

The polyether macromonomers (B) thus selected have the advantage that on account of the polyalkylene oxide component they are highly water-soluble and exhibit a good dispersing effect.

The method of utilizing may be characterized in that the branched polyether macromonomer (B) has a molecular weight in the range from 700 to 15 000 g/mol, preferably from 1500 to 10 000 g/mol and more preferably from 3000 to 8000 g/mol. An advantage is that an acceptable dispersing effect and low viscosities in the application can be obtained.

The method of utilizing may be characterized in that the molar ratio of (A) acid monomer to (B) polyether macromonomer is from 20/1 to 1/1, preferably 15/1 to 1.5/1 and more preferably from 10/1 to 3/1. Especially in the case of relatively high molecular weights of the polyether macromonomer (B), relatively high fractions of acid monomers (A) are advantageously, in order to compensate the high mass of polyether macromonomer (B) by the presence of a greater number of anionic so-called anchor groups, which are able to interact with the cement surface, more particularly with calcium ions. Particular preference is given to a polyether macromonomer (B) molecular weight in the range from 3000 to 8000 g/mol and a molar ratio of (A) acid monomer to (B) polyether macromonomer of 13/1 to 3/1, especially preferably of 10/1 to 5/1.

The method of utilizing may be characterized in that the copolymer is obtainable by radical polymerization in the presence of the ethylenically unsaturated acid monomer (A) and of the ethylenically unsaturated polyether macromonomer (B), so that in total at least 45 mol %, preferably at least 80 mol %, of all of the structural units of the copolymer have been produced by copolymerization of acid monomer (A) and polyether macromonomer (B).

It is also possible for further ethylenically unsaturated monomers (C) to be copolymerized as well. Suitable comonomers are ethylenically unsaturated compounds which can be copolymerized radically with the comonomers (A) and (B). Examples include the following: $C_1$-$C_{10}$ alkyl esters of ethylenically unsaturated monocarboxylic or dicarboxylic acids, more particularly of (meth)acrylic acid, vinyl acetate, vinylaromatics such as, in particular, styrene and α-methylstyrene, α-olefins such as, in particular $C_{12}$-$C_{20}$ α-olefins, additionally vinyl chloride, acryloylnitrile and N-vinylpyrrolidone. Preferred examples of $C_1$-$C_{10}$ alkyl esters of ethylenically unsaturated monocarboxylic acids are methyl (meth) acrylate, ethyl (meth)acrylate, n-butyl (meth)acrylate and 2-ethyl hexyl (meth)acrylate. Preferred in particular are $C_1$-$C_{10}$ alkyl esters of ethylenically unsaturated monocarboxylic or dicarboxylic acids, more particularly of acrylic acid.

Also provided are dispersants for inorganic binders, comprising a copolymer as defined above. Besides the subject copolymers, the subject dispersant may also comprise other formulating ingredients such as rheological assistants (e.g. cellulose ethers or starch ethers) and/or redispersible polymer powders, defoamers, air entrainers and so on. It is also possible to use other polycarboxylate ethers in formulations, or other superplasticizers such as lignosulphonates or melamine sulphonates.

Also provided are building material mixtures comprising inorganic binders, preferably cement, and a dispersant for inorganic binders, comprising a subject copolymer described above.

The inorganic binder or the inorganic binders here is or are preferably selected from cements, more particularly portland cements and aluminate cements, from α-calcium sulphate hemihydrate, β-calcium sulphate hemihydrate, anhydrite and lime, from slags, more particularly blast furnace slag, slag sand, ground slag sand, electrothermal phosphorous slag and stainless steel slag, from pozzolanic binders, more particularly fly ashes, preferably brown coal fly ash and mineral coal fly ash, microsilica, metakaolin, natural pozzolans, more particularly tuff, trass and volcanic ash, natural and synthetic zeolites, calcined oil shale, and mixtures of these.

It is possible to dry the subject dispersants by conventional drying methods such as spray drying, for example, and to incorporate the resultant, largely water-free products into inorganic binders. The dry mortars obtained in this way can be used on the construction site itself by being batch-mixed with water (without addition of superplasticizers). The amount of the subject dispersant that is added is typically in the range of from 0.1 to 1 wt %, based on the inorganic binder or binders, preferably 0.2 to 0.6 wt %. The dry mortars often include rheological assistants such as cellulose ethers and/or redispersible polymer powders, defoamers, air entrainers and so on.

EXAMPLES

1. General Experimental Procedure for Preparing Branched Polyether Monoalcohols of the General Structural Formula (II) (HO—$V_kL_{k+1}$)

A 2-liter flask with dropping funnel, magnetic stirrer and reflux condenser was charged with a solution of the corresponding methylpolyethylene glycol (see Table 1) in 1177 ml of dioxane. With stirring, 40 g of KOH pellets are added. This initial charge is heated to 105° C. and the required amount of epichlorhydrin (corresponding to Table 1), in solution in dioxane, is added over a period of customarily 30 minutes. The reaction solution is subsequently stirred at 105° C. for 17 hours and then cooled to room temperature. The potassium chloride formed is removed by filtration, and the solvent is removed under reduced pressure at 35 mbar. Ten different types of branched polyether monoalcohols of the general structural formula (II) (HO—$V_kL_{k+1}$) were obtained, and they were either reacted directly to give polyether macromonomers (B) of the general structural formula (I) (E-$V_kL_{k+1}$) or, as in the case of sample 10, were alkoxylated with 10 equivalents of ethylene oxide (spacer), or, as in the case of sample 4, were transformed into an amine derivative (general formula NH(R)—$V_kL_{k+1}$) with replacement of the hydroxyl group by an $NH_2$ group.

In this case the amination was carried out as follows (amination for macromonomer 4):

To carry out the amination, 1 mol of the branched monoalcohol and a catalyst (25 g) were placed into an autoclave vessel. The catalyst contains Ni, Co, Cu, $Al_2O_3$ and Sn on graphite (US 2011/0137030).

The autoclave was flushed with nitrogen in order to prevent oxidation of catalyst. 42.6 g of ammonia were likewise placed into the autoclave, and the desired hydrogen partial pressure of 40 bar at room temperature was set. The reaction was initiated by heating, and the start of the reaction was specified as the attainment of a temperature of 214° C. Thereafter the reaction product was allowed to stand with stirring at 210° C. for a further 10 hours. The discharge from the experiment was freed from traces of the catalyst by means of a pressure filtration. This gave 28 g of the branched amine 4.

Reaction with Ethylene Oxide (Spacer-Modified Alcohol for Macromonomer 10):

The branched monoalcohol (1 eq.) and potassium methoxide (1 eq.) are weighed out and agitated on a rotary evaporator at a pressure of about 20 mbar for 120 minutes at 90° C., and the methanol formed in this reaction is taken off.

This reaction solution is transferred to the reactor, which has been dried beforehand, and the reactor is closed and inertized with nitrogen to 5 bar three times. The batch is subsequently heated to 120° C. with stirring and a preliminary nitrogen pressure of 3.5 bar is set. Then 0.1 equivalent of ethylene oxide is metered in under mass control over the course of 20 minutes. Following onset of the reaction, a further 9.9 equivalents of ethylene oxide are metered in under mass control over the course of 420 minutes. After the end of metering, the batch is stirred at 120° C. for a further 420 minutes. The batch is cooled to 80° C. and flushing takes place with nitrogen (about 0.5 $m^3$/h) into the off-gas line for 30 minutes, and the clear, yellowish product is drained from the reactor. The yield is quantitative.

2. General Experimental Procedure for the Preparation of Polyether Macromonomers (B) of the General Structural Formula (I) (E-$V_{k+1}$)

2.1 Vinylation to the Vinyl Alcohol by Reaction of the Branched Polyether Monoalcohols with Acetylene A 2.5 l autoclave was charged with 1 mol of the branched polyether monoalcohol and 10 g of KOH, and this initial charge was inertized with nitrogen (2 bar) and thereafter heated to 120° C. Acetylene was then injected with a pressure of 20 bar and the reaction mixture was stirred at 120° C. and 20 bar until a total of 26 g of acetylene had been taken up. Thereafter it was cooled to room temperature and let down and the residue, after heating at 60° C. for 3 hours with stirring, was degassed and then removed from the autoclave. The conversion is quantitative. A comparison may be made in particular with sample 5 from Table 1.

2.2 Reaction with Methacryloyl Chloride to the Methacrylic Ester:

0.01 mol of the respective branched macroalcohol from Table 1 (product of the respective methylpolyethylene glycol and epichlorohydrin) is melted in a round-bottomed flask at 80° C. Slowly, 0.04 mol of triethylamine and 600 ppm of p-methoxyphenol are added. Then 0.03 mol of triethylamine is added dropwise and the mixture is stirred at 80° C. for 6 hours.

After cooling, the solid material is dissolved in 50 ml of THF and the precipitate is isolated by filtration. Then 30 ml of 0.1 N HCl solution are added and the aqueous phase is removed.

The organic phase is freed from the solvent. This gives the macromonomer with a selectivity of 97% (determined by HPLC and NMR).

2.3 Reaction with Methylacrylic Anhydride to the Methacrylic Ester:

0.1 mol of the respective branched alcohol from Table 1 (product of the respective methylpolyethylene glycol and epichlorohydrin) is melted at 90° C. in a flask. Following addition of 0.1 mol of $Na_2CO_3$ and 0.0013 mol of butylated hydroxytoluene, 0.27 mol of methacrylic anhydride is added dropwise. The mixture is stirred for 4 hours. Then 300 ml of water are added and stirring takes place at 60° C. for 1 hour. The solution is adjusted with $H_3PO_3$ to a pH of 6. Excessive methacrylic acid is extracted by shaking with water or removed by filtration over basic aluminium oxide. This gives the desired macromonomer in selectivities of more than 96% (HPLC and NMR).

TABLE 1

Data of the polyether macromonomers (B)

| | Polyether macromonomer (B) (No.) | | | | | | | | | | |
|---|---|---|---|---|---|---|---|---|---|---|---|
| | 1a | 1b | 2 | 3 | 6 | 7 | 8 | 9 | 10 [1)] | 4 [2)] | 5 |
| Side chain length (g/mol) of the methyl-polyethylene glycols used (=HO-L) and amount in mol | 750 g/mol [0.667 mol] | 750 g/mol [0.667 mol] | 2000 g/mol [0.667 mol] | 750 g/mol [0.455 mol] + 2000 g/mol [0.455 mol] | 2000 g/mol [0.247 mol] | 350 g/mol [1.429 mol] | 350 g/mol [0.455 mol] + 705 g/mol [0.455 mol] | 350 g/mol [1.429 mol] | 750 g/mol [0.667 mol] | 750 g/mol [0.667 mol] | 350 g/mol [1.429 mol] |

TABLE 1-continued

Data of the polyether macromonomers (B)

| | Polyether macromonomer (B) (No.) | | | | | | | | | | |
|---|---|---|---|---|---|---|---|---|---|---|---|
| | 1a | 1b | 2 | 3 | 6 | 7 | 8 | 9 | 10 [1] | 4 [2] | 5 |
| Epichlorohydrin | 0.583 mol | 0.583 mol | 0.583 mol | 0.796 mol | 0.216 mol | 1.072 mol | 0.796 mol | 1.250 mol | 0.583 mol | 0.583 mol | 1.250 mol |
| Molecular weight (determined by GPC) | 1844 g/mol | 1844 g/mol | 4057 g/mol | 4481 g/mol | 6550 g/mol | 1611 g/mol | 1636 g/mol | 1612 g/mol | 2284 g/mol | 1844 g/mol | 1864 g/mol |
| Polymerizable group E | | | | | Methacrylic ester | | | | Methacryl-amide | Vinyl ether | |

[1] After the reaction of the methylpolyethylene glycol with epichlorohydrin, the branched monoalcohol was alkoxylated with 10 equivalents of ethylene oxide.
[2] After the reaction of the methylpolyethylene glycol with epichlorohydrin, the branched monoalcohol was hydroaminated.
1a and 2-10: ester prepared from methacrylic anhydride
1b: ester prepared from methacryloyl chloride Polymerization of the Polyether Macromonomers (B) with Methacrylic Acid (Acid Monomer A):

A Büchi double-wall glass reactor is charged with 47 g of water and this initial charge is heated to 60° C. with nitrogen blanketing. Over a period of 4 hours, a solution of 0.01 mol of the corresponding macromonomer and the corresponding amount of methacrylic acid is then added dropwise (Table 2). The initiator (sodium persulphate) is metered in over the course of 4.5 hours as a 7% aqueous solution with 3 mol %, based on the amount of polymerizable double bonds (amount of macromonomer+amount of methacrylic acid). Following after polymerization for an hour, the polymer solution is cooled and neutralized to a pH of 6.5 with aqueous sodium hydroxide solution. The polymer solution is diluted to give a solids content of 30%.

Polymerization of the Polyether Macromonomers (B) with Acrylic Acid (Acid Monomer A):

A glass reactor equipped with stirrer, pH electrode and a number of feed facilities is charged with 40 g of deionized water and 0.1 mol of the corresponding macromonomer and this initial charge is brought to a polymerization start temperature of 15° C. Subsequently, in a separate feed vessel, the required amount of acrylic acid (see Table 1) is mixed with 16 g of water (solution A). In parallel with this, a 6% strength solution of Brüggolit® E 01 is prepared (solution B). With stirring and cooling, first 0.24 g of 3-mercaptopropionoic acid, 0.012 g of $Fe_2(SO_4)_3$ and 0.64 g of a 30% strength aqueous $H_2O_2$ solution are added. At the same time as this, the addition of solutions A and B is commenced. Solution A is added with a metering rate of 24 ml/h, solution B is added at a rate of 15.2 ml/h until the solution is peroxide-free. The polymer solution obtained is then adjusted to a pH of 6.5 with 50% strength aqueous sodium hydroxide solution. The polymer solution is diluted with water until it has a solids content of 30%. The results of the copolymerizations are summarized in Table 2.

TABLE 2

Copolymers of (A) and (B)

| Copolymer | Macro-monomer (B) | (B) (mol)/(A) (mol) (type* of (A)) | $M_w$ [g/mol] |
|---|---|---|---|
| 1 | 1a | 1/5 (MAS) | 21 000 |
| 2 | 2 | 1/7 (MAS) | 27 000 |
| 3 | 3 | 1/7 (MAS) | 25 000 |
| 5 | 5 | 1/8 (AS) | 33 000 |
| 6 | 6 | 1/7 (MAS) | 25 000 |
| 7 | 7 | 1/5 (MAS) | 29 000 |
| 8 | 8 | 1/5 (MAS) | 18 000 |
| 9 | 9 | 1/5 (MAS) | 18 000 |
| 10 | 10 | 1/5 (MAS) | 18 000 |
| 11 | 1a | 1/1/5 (HEMA/MAS) | 21 000 |
| 12 | 1b | 1/12 (MAS) | 23 000 |
| 13 | 1b | 1/20 (MAS) | 17 000 |
| 14 | 1b | 1/12 (MAS) | 20 000 |
| 15 | 1b | 1/12 (MAS) | 45 000 |
| 16 | 1b | 1/12 (MAS) | 24 000 |

*Abbreviations for type of acid monomer (A): AS: Acrylic acid MAS: Methacrylic acid HEMA: Hydroxyethyl methacrylate Mortar Tests The mortar tests were carried out in accordance with the DIN EN 1015-3 standard. The cement used here was a Karlstadt cement from Schwenk. In the experiments, a sand/cement ratio of 2.2 was used. In this case a mixture of 70% standard sand (Normensand GmbH, Beckum) and 30% quartz sand was used. The water/cement ratio was set always at 0.43. The addition of the superplasticizer is indicated in wt % of solid, based on the cement.

TABLE 3

Mortar results with Karlstadt cement

| | Level of | Slump spread [cm] | | |
|---|---|---|---|---|
| Copolymer | addition | 0 min | 10 min | 30 min |
| Glenium ® ACE 440* | 0.17 | 24.2 | 25.9 | 25.6 |
| 1 | 0.23 | 23.4 | 21.6 | 19 |
| 2 | 0.18 | 23.5 | 23.3 | 21.7 |
| 3 | 0.22 | 24.5 | 23.1 | 21.3 |
| 5 | 0.21 | 23.7 | 22.1 | 19.2 |
| 6 | 0.18 | 23.5 | 23.3 | 21.7 |
| 7 | 0.4 | 23.8 | 24.2 | 21.8 |
| 8 | 0.21 | 23.6 | 25.2 | 25 |
| 9 | 0.32 | 23.9 | 24.1 | 22.7 |
| 10 | 0.33 | 23.8 | 23.3 | 23.2 |
| 11 | 0.33 | 23.7 | 24.1 | 23.8 |
| 12 | 0.25 | 25 | 23.3 | 20.4 |
| 13 | 0.3 | 24.5 | 24.8 | 23.8 |
| 14 | 0.3 | 24 | 25.2 | 23.9 |

TABLE 3-continued

Mortar results with Karlstadt cement

| Copolymer | Level of addition | Slump spread [cm] | | |
|---|---|---|---|---|
| | | 0 min | 10 min | 30 min |
| 15 | 0.32 | 24.4 | 24.1 | 22.7 |
| 16 | 0.25 | 25 | 23.3 | 20.4 |

*Glenium ACE 440 is, for comparison, a polycarboxylate ether with the monomers acrylic acid, maleic acid and ethoxylated hydroxybutyl vinyl ether (linear side chain). It is available from BASF Construction Chemicals Italia Spa.

The level of addition of the superplasticizer in Table 3 is indicated in wt % of solid, based on the cement.

On the basis of these results it is clear that the amount of water required to plasticize a mortar to a particular slump spread is drastically reduced by the addition of these polymers. If the superplasticizer is not added, a water/cement ratio (w/c) of 0.55 is needed in order to obtain a slump spread of 23-25 cm.

The superplasticizers with side chain branching, as compared with linear side chains (comparative experiment with Glenium® ACE 440), require a higher acrylic acid fraction in order to achieve a similar plasticization.

Further mortar tests with Monselice cement were carried out with a cone as described in DIN EN 1015-3. The results are the flows indicated in Table 4.

The materials and mortar formula used were as follows:
cement: Monselice CEM 152.5 R
w/c=0.42-0.44
s/c=3 (standard sand (Normensand GmbH, Beckum))

All of the polymers were used as 20% strength solutions, formulated with defoamer (4 wt % tributyl phosphate, based on the solids of the copolymer).

TABLE 4

Mortar results with Monselice cement

| Copolymer No. | w/c | % by wt. of solid copolymer based on cement | Flow [cm] | |
|---|---|---|---|---|
| | | | 0 min | 30 min |
| Glenium® ACE 440* | 0.44 | 0.24 | 131 | 131 |
| 6 | 0.44 | 0.60 | 133 | 100 |
| 2 | 0.44 | 0.32 | 129 | 97 |
| 1 | 0.44 | 0.32 | 127 | 95 |
| Glenium® ACE 440* | 0.42 | 0.24 | 110 | 112 |
| 7 | 0.42 | 0.60 | 114 | 100 |
| 8 | 0.42 | 0.36 | 112 | 105 |
| 10 | 0.42 | 0.44 | 110 | 103 |
| 9 | 0.42 | 0.40 | 108 | 93 |

*Glenium ® ACE 440 is a polycarboxylate ether with the monomers acrylic acid, maleic acid and ethoxylated hydroxybutyl vinyl ether. It is available from BASF Construction Chemicals Italia Spa.

Concrete Tests, Including Measurement of the Plastic Viscosity

The cement used for the viscosity measurements was CEM 152.5 from Montselice and another CEM I 52.5 cement. The following mixture design was used:

| | |
|---|---|
| Sand 0-4 | 1050 kg/m³ |
| Gravel 8-12 | 770 kg/m³ |
| Cement type I 52.5 | 400 kg/m³ |
| Water | 180 kg/m³ |

The ambient temperature was 20° C. and the superplasticizers were used in the form of 20% strength solutions, formulated with 4 wt % of defoamer (tributyl phosphate) based on the solids of the superplasticizer.

In order to obtain comparable results, the amount of additive was calculated such that all of the fresh concretes gave a slump of 22 to 24 cm after 5 minutes in accordance with DIN EN 12350. The water/cement ratios were set at 0.45 and the measurement was carried out after 5 minutes and after 20 minutes. The results are summarized in Tables 5a (Monselice cement) and 5b.

Apart from the plasticization, another significant factor for the use as stipulated is the viscosity of the fresh concrete. The viscosity is a measure of the pumpability and processing properties of the fresh concrete. Lower values for the viscosity result in better processing properties and hence in better pumpability (Gleitrohr-Rheometer: Ein Verfahren zur Bestimmung der Fließeigenschaften von Dickstoffen in Rohrleitungen [Sliding pump rheometer: A method to establish the flow properties of viscous media in pipelines], Thesis by Dr Knut Jens Kasten, TU Dresden. Shaker Verlag; $1^{st}$ edn. (July 2010)).

The plastic viscosities of the fresh concrete were measured in an IKAR rheometer (reference: E. P. Koehler, D. W. Fowler (2007). "ICAR Mixture Proportioning Procedure for SCC" International Center for Aggregates Research, Austin, Tex.).

TABLE 5a

Slump flow and plastic viscosities with Montselice CEM I 52.5 R

| Copolymer | % by wt. solids copolymer based on cement | Air pore content (%) | Slump (cm) Slump flow (cm) | | Plastic viscosity μ (Pa * s) |
|---|---|---|---|---|---|
| | | | 5 Min | 20 Min | |
| Glenium® ACE 440* | 0.24 | 1.9 | 23 43 | 23 — | 184 |
| 1 | 0.35 | — | 24 52 | 23.5 50 | 151 |
| 2 | 0.3 | 1.9 | 22 38 | 21 35 | 152 |
| 6 | 0.42 | 1.8 | 23 54 | 23.5 47 | 147 |
| 10 | 0.46 | 2.3 | 21 — | 16 — | 128 |
| 8 | 0.36 | 2.0 | 23.5 46 | 23.5 46 | 140 |
| 9 | 0.4 | 2.1 | 24 50 | 24 47 | 136 |

*Glenium ®ACE 440 is a polycarboxylate ether with the monomers acrylic acid, maleic acid and ethoxylated hydroxybutyl vinyl ether. It is available from BASF Construction Chemicals Italia Spa.

TABLE 5b

Slump flow and plastic viscosities with CEM I 52.5 R

| Copolymer | % by wt. solids copolymer based on cement | Air pore content (%) | Slump (cm) Slump flow (cm) | | Plastic viscosity μ (Pa * s) |
|---|---|---|---|---|---|
| | | | 5 Min | 20 Min | |
| Glenium® ACE 440* | 0.18 | 2.1 | 23.5 46 | 19 30 | 273 |
| 1 | 0.33 | 2.4 | 23 37 | 14 — | 170 |
| 2 | 0.21 | 2.8 | 23.5 43 | 12 — | 187 |

Commercial superplasticizers are often comb polymers with linear polyethylene glycol side chains (PEG side chains). However, when used as water reducers, these superplasticizers lead to relatively high plastic viscosities on the part of the fresh concrete. This makes it more difficult to pump the fresh concrete and to place it into moulds.

The subject dispersants plasticize concretes and make it possible in particular to obtain low concrete viscosities. As is apparent from the comparison of Glenium® ACE 440 with the subject copolymers, the subject copolymers represent a good possibility for preparing fresh concretes having low viscosities even in the case of relatively low w/c values. It is also noted that the viscosity of the concrete without added superplasticizer could not be properly measured, since, because of the lack of plasticity, much higher w/c values would otherwise have to be used here.

The invention claimed is:

1. A method of utilizing a copolymer for dispersing inorganic binders, the method comprising forming a mixture of inorganic binder, water, and the copolymer comprising as comonomers in copolymerized form:
(A) at least one ethylenically unsaturated acid monomer,
(B) at least one ethylenically unsaturated, branched polyether macromonomer of the general formula $E-V_kL_{k+1}$, where
E is an ethylenically unsaturated structural unit which comprises at least one ether, carboxylic ester or carboxamide structural unit,
V is a branched structural unit of the formula $-CH(CH_2O-)_2$, and
L is a linear structural unit of the formula $-[A^1O]_l-A^2$, where
$A^1$ in each case independently is selected from $C_2$-$C_{10}$ alkylene, $C_6$-$C_{10}$ arylene or $C_7$-$C_{10}$ aralkylene,
$A^2$ in each case independently is selected from $C_1$-$C_{30}$ alkyl, $C_3$-$C_{10}$ cycloalkyl, $C_6$-$C_{30}$ aryl or $C_7$-$C_{30}$ aralkyl,
k is an integer from 1 to 7, and
l in each case independently is an integer from 1 to 350.

2. The method according to claim 1, characterized in that the inorganic binder is selected from cements, portland cements, aluminate cements, a-calcium sulphate hemihydrate, β-calcium sulphate hemihydrate, anhydrite, lime, industrial slags synthetic slags, blast furnace slags, slag sand, ground slag sand, electrothermal phosphorus slag, stainless steel slag, pozzolanic binders, fly ashes, brown coal fly ash, mineral coal fly ash, microsilica, metakaolin, natural pozzolans, tuff, trass, volcanic ash, natural zeolites, synthetic zeolites, calcined oil shale or mixtures of these.

3. The method according to claim 1, characterized in that the at least one copolymerized ethylenically unsaturated acid monomer (A) is present in the copolymer in the form of one of the following structural units (Ia) to (Id):

(Ia)

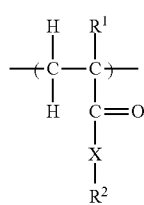

where
$R^1$ in each case independently is selected from H, an unbranched or branched $C_1$-$C_4$ alkyl group,
X in each case independently is selected from a single bond, $-NH-(C_mH_{2m})-$ and/or $-O-(C_mH_{2m})-$, where m is an integer from 1 to 4,
$R^2$ in each case independently is selected from $-OM_{1/q}$, $-SO_3M_{1/q}$, $-PO_3M_{2/q}$, $-O-PO_3M_{2/q}$, $-C_6H_4-SO_3M_{1/q}$, $-C_6H_4-PO_3M_{2/q}$, and/or $-C_6H_4-OPO_3M_{2/q}$, where M is selected from H, alkali metals, alkaline earth metals, aluminium or metals of the first transition series, and q represents the charge number of M, with the proviso that $R^2$ is represented by $-OM_{1/q}$ if X is a single bond;

(Ib)

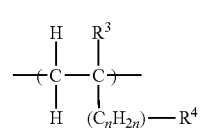

where
$R^3$ has the meaning given above for $R^1$,
n is an integer from 0 to 4,
$R^4$ in each case independently is selected from $-SO_3M_{1/q}$, $-PO_3M_{2/q}$, $-O-PO_3M_{2/q}$ or $-C_6H_4-SO_3M_{1/q}$, where M and q have the meanings stated above;

(Ic)

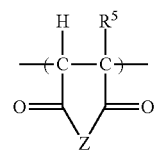

where
$R^5$ has the meaning given above for $R^1$,
Z in each case independently is selected from $-O-$ or $-NH-$;

(Id)

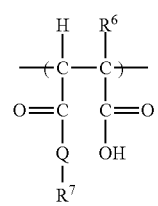

where
$R^6$ has the meaning given above for $R^1$,
Q has the meaning given above for X and,
$R^7$ has the meaning given above for $R^2$.

4. The method according to claim 3, characterized in that in the formula (Ia)

$R^1$ is H or methyl,

X in each case independently is selected from —NH—$(C_mH_{2m})$—, —O—$(C_mH_{2m})$—, —O—$(C_2H_4)$—, or —NH—$(C(CH_3)_2CH_2)$—, and $R^2$ is —O—$PO_3M_{2/q}$ or —O—$SO_3M_{1/q}$, where m, M and q have the meanings given above.

5. The method according to claim 1, characterized in that the acid monomer (A) or the acid monomers (A) is or are selected from (meth)acrylic acid and salts thereof, maleic acid, its monoesters, monoamides and salts, maleic anhydride or hydroxyalkyl (meth)acrylic phosphoric esters and salts thereof.

6. The method according to claim 1, characterized in that the copolymer comprises as additional comonomer in copolymerized form an unbranched polyether macromonomer of the general formula E-L where E and L have the meanings given above.

7. The method according to claim 1, characterized in that the structural unit E in each case independently is selected from a vinyl ether, allyl ether, isopreneyl ether, (meth)acrylic ester, (meth)acrylamide, maleic monoester or maleic monoamide unit.

8. The method according to claim 1, characterized in that the ethylenically unsaturated structural unit E is present in the form of E*-S, where E* in each case independently is selected from a vinyl ether, allyl ether, (meth)acrylic ester or maleic monoester unit and S is a (poly)alkylene glycol unit -$[A^3O]_m$—, where $A^3$ in each case independently is selected from $C_2$-$C_{10}$ alkylene, $C_6$-$C_{10}$ arylene or $C_7$-$C_{10}$ aralkylene, and m is in each case independently an integer from 1 to 50.

9. The method according to claim 1, characterized in that $A^1$ in each case independently is present to an extent of more than 60 mol %, based on all of the structural units of the formula -$[A^1O]_l$, in the form of —$C_2H_4$—, $A^2$ in each case independently is selected from $C_1$-$C_4$ alkyl, k is an integer from 1 to 3 and l in each case independently is an integer from 2 to 100.

10. The method according to claim 1, characterized in that the branched polyether macromonomer (B) has a molecular weight in the range from 700 to 15 000 g/mol.

11. The method according to claim 1, characterized in that the molar ratio of (A) acid monomer to (B) polyether macromonomer is from 20/1 to 1/1.

12. The method according to claim 1, characterized in that the copolymer is obtained by radical polymerization in the presence of the ethylenically unsaturated acid monomer (A) and of the ethylenically unsaturated polyether macromonomer (B), so that in total at least 45 mol % of all of the structural units of the copolymer have been produced by copolymerization of acid monomer (A) and polyether macromonomer (B).

13. Building material mixture comprising inorganic binders and a dispersant comprising a copolymer comprising as comonomers in copolymerized form:

(A) at least one ethylenically unsaturated acid monomer, (B) at least one ethylenically unsaturated, branched polyether macromonomer of the general formula E-$V_kL_{k+1}$, where E is an ethylenically unsaturated structural unit which comprises at least one ether, carboxylic ester or carboxamide structural unit, V is a branched structural unit of the formula —CH$(CH_2O$—$)_2$, and L is a linear structural unit of the formula -$[A^1O]_l$-$A^2$, where $A^1$ in each case independently is selected from $C_2$-$C_{10}$ alkylene, $C_6$-$C_{10}$ arylene or $C_7$-$C_{10}$ aralkylene, $A^2$ in each case independently is selected from $C_1$-$C_{30}$ alkyl, $C_3$-$C_{10}$ cycloalkyl, $C_6$-$C_{30}$ aryl or $C_7$-$C_{30}$ aralkyl, k is an integer from 1 to 7, and l in each case independently is an integer from 1 to 350.

14. The building material according to claim 13, wherein the inorganic binder is cement.

\* \* \* \* \*